US010061607B2

(12) United States Patent
Zhang et al.

(10) Patent No.: US 10,061,607 B2
(45) Date of Patent: Aug. 28, 2018

(54) SYSTEM AND METHOD FOR PROVIDING SINGLE GROUP MULTIPLE BRANCHES BASED ON INSTANCE AWARENESS

(71) Applicant: Oracle International Corporation, Redwood Shores, CA (US)

(72) Inventors: Qingsheng Zhang, Beijing (CN); Xugang Shen, Beijing (CN); Todd J. Little, Palatine, IL (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 14/709,740

(22) Filed: May 12, 2015

(65) Prior Publication Data
US 2015/0324223 A1    Nov. 12, 2015

Related U.S. Application Data

(60) Provisional application No. 61/991,937, filed on May 12, 2014.

(51) Int. Cl.
*G06F 9/46* (2006.01)
*G06F 9/50* (2006.01)

(52) U.S. Cl.
CPC .............. *G06F 9/46* (2013.01); *G06F 9/466* (2013.01); *G06F 9/50* (2013.01)

(58) Field of Classification Search
CPC ............... G06F 9/46; G06F 9/466; G06F 9/50
USPC ................. 717/101–102, 120–121; 718/101
See application file for complete search history.

(56) References Cited

U.S. PATENT DOCUMENTS

| 6,771,947 B1 * | 8/2004 | Griffiths | H04M 3/436 379/207.02 |
| 7,284,018 B1 * | 10/2007 | Waldorf | G06F 9/466 707/607 |
| 2005/0144299 A1 * | 6/2005 | Blevins | G06F 17/30595 709/230 |
| 2008/0066068 A1 * | 3/2008 | Felt | G06F 9/466 718/101 |

(Continued)

OTHER PUBLICATIONS

Biru Chattopadhayay, "Getting Started with Oracle Tuxedo", Jun. 2013, Packt Publishing, 158 pages.*

(Continued)

*Primary Examiner* — Ted T Vo
(74) *Attorney, Agent, or Firm* — Tucker Ellis LLP

(57) ABSTRACT

A system and method can provide high throughput transactions in a transactional system. A system and method can, via a transaction manager, obtain information on a plurality of resource managers. The transaction manager can further manage a plurality of transaction branches, where each of the plurality of transaction branches can be associated with a different one of the plurality of resource managers. The methods and systems can associate a transaction identifier with each of the plurality of transaction branches, which can result in a plurality of transaction identifiers, where each of the plurality of transaction identifiers can include a branch identifier for each of the plurality of transaction branches. The methods and systems can perform one or more transactional operations on the plurality of transaction branches based on the different transaction identifiers.

20 Claims, 4 Drawing Sheets

(56) References Cited

U.S. PATENT DOCUMENTS

2014/0157276 A1* 6/2014 Smithson ............... G06F 9/466
　　　　　　　　　　　　　　　　　　　　　　　718/101

OTHER PUBLICATIONS

DataDirect, "Understanding JTA—the Java® Transaction API", 2005, DataDirect Technologies Corp., 12 pages.*
Paul Parkinson, "Java Transaction API (JTA)", 2012, Oracle Corporation, 82 pages.*
Oracle Tuxedo, "Setting Up an Oracle Tuxedo Application", Jun. 2012, Oracle Corporation, 351 pages.*
Oracle(R) Tuxedo "Setting Up an Oracle Tuxedo Application", 12c Release 1 (12.1.1), Jun. 2012, 330 pages.
Oracle(R) Tuxedo "Setting Up an Oracle Tuxedo Application", 12c Release 2 (12.1.3), Apr. 2014, 380 pages.
Little, Todd., "Announcing the Tuxedo Advanced Performance Pack", Nov. 5, 2015, 5 pages.

* cited by examiner

SYSTEM AND METHOD FOR PROVIDING SINGLE GROUP MULTIPLE BRANCHES BASED ON INSTANCE AWARENESS

CLAIM OF PRIORITY

This application claims priority on U.S. Provisional Patent Application No. 61/991,937, entitled "SYSTEM AND METHOD FOR PROVIDING SINGLE GROUP MULTIPLE BRANCHES BASED ON INSTANCE AWARENESS," by inventors Qingsheng Zhang, Xugang Shen, and Todd Little, filed May 12, 2014, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems and software such as middleware, and is particularly related to transactional middleware.

BACKGROUND

In today's computing environment the use of distributed or global transactions is becoming more widespread with the adoption of Java™ EE component based architectures. The XA standard is an X/Open™ specification for distributed transaction processing (DTP) across heterogeneous data sources (e.g. Oracle Database and DB2) that was published in 1991. A general overview of the XA specification for distributed transaction processing, including basic architecture Information can be found in the "X/Open CAE Specification—Distributed Transaction Processing: The XA Specification" (X/Open 1991) which is incorporated herein by reference. A copy of this document can be obtained by requesting X/Open Document No. XO/CAE/91/300 or ISBN 1 872630 24 3 from X/Open Company, Ltd., 1010 El Camino Real, Suite 380, Menlo Park, Calif. 94025, U.S.A. The XA specification describes the interface between the transaction coordinator and the data sources that participate in the distributed transaction. Within XA the transaction coordinator is termed the transaction manager and the participating data sources are termed the resource managers. Transaction managers and resource managers that follow the XA specification are said to be XA compliant.

Some products, such as the Oracle™ database and Oracle™ WebLogic Sever can act as either transaction managers or resource managers or both within the same XA transaction. Examples of XA transaction managers are: Oracle™ Tuxedo, Oracle™ WebLogic Server, the Oracle™ database and IBM™ WebSphere Application Server. Examples of XA resource managers are: Oracle™ Database, IBM™ DB2, MS-SQL, IBM™ MQ-Series and Java™ Message Service (JMS). Additional information concerning design implications when using XA or Oracle™ controlled distributed transactions can be found in "Oracle White Paper—XA and Oracle controlled Distributed Transactions" (Oracle 2010), which is incorporated herein by reference.

The XA specification thus describes a protocol and interface between an application server, transaction manager and one or more resource managers. The XA specification enables a plurality of resources, such as application servers and databases, to be accessed within the same transaction, thus preserving the ACID (atomicity, consistency, isolation, durability) properties of the transaction in a distributed transaction processing environment.

A transactional middleware system, or transaction oriented middleware, includes enterprise application servers that can process various transactions within an organization. With the developments in new technologies such as high performance network and multiprocessor computers, there is a need to further improve the performance of transactional middleware. These are generally the areas that embodiments of the invention are intended to address.

SUMMARY

Described herein are systems and methods that can provide high throughput transactions in a transactional system. A transaction manager can obtain information on a plurality of resource managers. The transaction manager can further manage a plurality of transaction branches, where each of the plurality of transaction branches can be associated with a different one of the plurality of resource managers. Additionally, the methods and systems can associate a transaction identifier with each of the plurality of transaction branches, which can result in a plurality of transaction identifiers. Furthermore, each of the plurality of transaction identifiers can include a branch identifier for each of the plurality of transaction branches. Furthermore, the transaction manager can perform one or more transactional operations on the plurality of transaction branches based on the different transaction identifiers.

In an embodiment, the information on the plurality of resource managers can include a unique identifier associated, respectively, with each of plurality the resource managers. Additionally, the unique identifiers for each of the plurality of resource managers can be associated with a different database instance.

In an embodiment, the methods and systems described herein can further store the information on a plurality of resource managers in a shared memory. Likewise, the methods and systems, in an embodiment, can also store each of the plurality of transaction identifiers in a shared memory.

In an embodiment, the systems and methods for providing high throughput transactions in a transactional system can include a method. The method can include, obtaining, via a transaction manager, information on a first resource manager and a second resource manager, wherein the transaction manager manages a first transaction branch and a second transaction branch, wherein the first transaction branch is associated with the first resource manager and the second transaction branch is associated with the second resource manager. The method continues with associating a first transaction identifier with the first transaction branch and a second transaction identifier with the second transaction branch, wherein the first transaction identifier includes a first branch identifier associated with the first transaction branch and the second transaction identifier includes a second branch identifier associated with the second transaction branch. The method also includes performing, via the transaction manager, a transactional operation on the first transaction branch and the second transaction branch, the transactional operation on the first transaction branch and the transactional operation on the second transaction branch being based on the first transaction identifier and the second transaction identifier, respectively.

DETAILED DESCRIPTION

Figure 1:
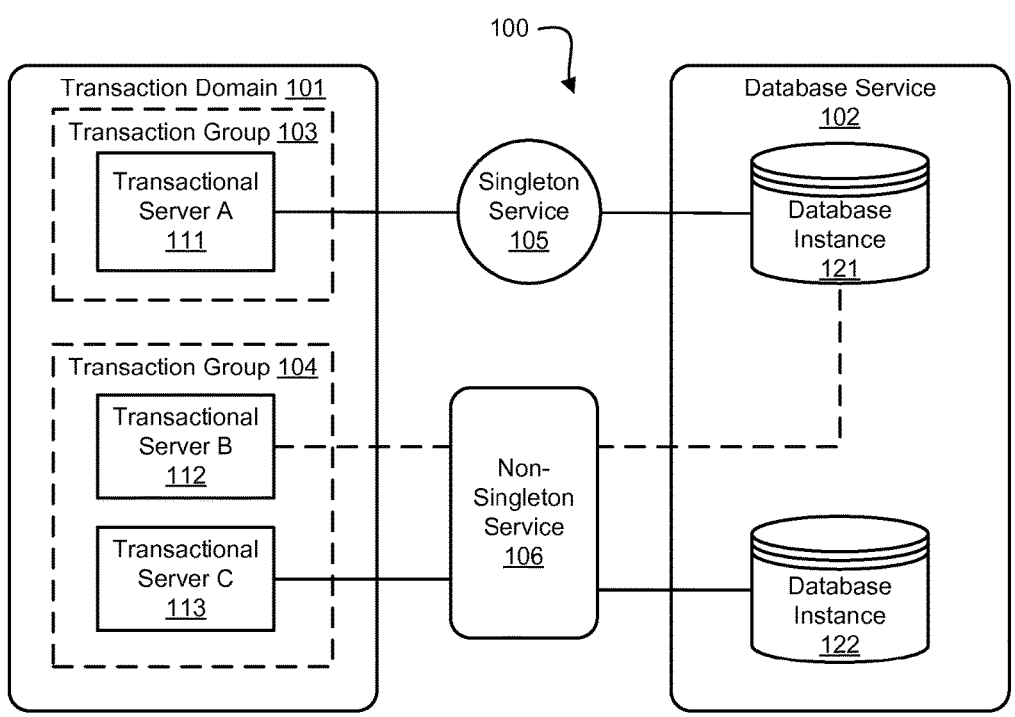
FIG. 1 shows an illustration of using a non-singleton service in a transactional environment, in accordance with an embodiment of the invention.

In the following detailed description, the invention will be illustrated by way of example and not by way of limitation in the figures of the accompanying drawings. It should be noted that references to "an" or "one" or "some" embodiment(s) in this disclosure are not necessarily to the same embodiment, and such references mean at least one. While specific implementations are discussed, it is understood that the specific implementations are provided for illustrative purposes only. A person skilled in the relevant art will recognize that other components and configurations may be used without departing from the scope and spirit of the invention.

The description of the invention as following uses the Tuxedo environment as an example for a transactional middleware machine environment. It will be apparent to those skilled in the art that other types of transactional middleware machine environments can be used without limitation.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention. In particular, the detailed description uses an XA distributed transaction environment as an example. It will be apparent to those skilled in the art that the present invention has application to other types of distributed transaction environment without limitation.

Common reference numerals are used to indicate like elements throughout the drawings and detailed description; therefore, reference numerals used in a figure may or may not be referenced in the detailed description specific to such figure if the element is described elsewhere.

Described herein are systems and methods that can support a transactional middleware machine environment.
Transactional Middleware Environment A transactional middleware system can comprise a combination of high performance hardware, e.g. 64-bit processor technology, high performance large memory, and redundant InfiniBand™ and Ethernet networking, together with an application server or middleware environment, such as WebLogic™ Suite, to provide a complete Java™ EE application server complex which includes a massively parallel in-memory grid, that can be provisioned quickly, and can scale on demand. The system can be deployed as a full, half, or quarter rack, or other configuration, that provides an application server grid, storage area network, and InfiniBand™ (IB) network. The middleware machine software can provide application server, middleware and other functionality such as, for example, WebLogic™ Server, JRockit™ or Hotspot JVM, Oracle™ Linux or Solaris, and Oracle™ VM. The system can include a plurality of compute nodes, IB switch gateway, and storage nodes or units, communicating with one another via an IB network. When implemented as a rack configuration, unused portions of the rack can be left empty or occupied by fillers.

For example, in systems such as "Sun Oracle Exalogic" or "Exalogic", the system is an easy-to-deploy solution for hosting middleware or application server software, such as the Oracle™ Middleware SW suite, or Weblogic. As described herein the transactional middleware system can be a "grid in a box" that comprises one or more servers, storage units, an IB fabric for storage networking, and all the other components required to host a middleware application. Significant performance can be delivered for all types of middleware applications by leveraging a massively parallel grid architecture using, e.g. Oracle™ Real Application Clusters (RAC) Enterprise database, which is a clustered database with shared cache architecture and can be a component of a cloud architecture, and Exalogic Open storage. The system delivers improved performance with linear I/O scalability, is simple to use and manage, and delivers mission-critical availability and reliability.

In accordance with an embodiment of the invention, a transactional middleware system, such as a Tuxedo system, can take advantage of fast machines with multiple processors, such as an Exalogic middleware machine, and a high performance network connection, such as an Infiniband™ (IB) network.

An Oracle™ Tuxedo system provides a set of software modules that enables the construction, execution, and administration of high performance, distributed business applications and has been used as transactional middleware by a number of multi-tier application development tools. Tuxedo is a middleware platform that can be used to manage distributed transaction processing in distributed computing environments. It is a proven platform for unlocking enterprise legacy applications and extending them to a services oriented architecture, while delivering unlimited scalability and standards-based interoperability.

Furthermore, Tuxedo provides a service-oriented infrastructure for efficiently routing, dispatching, and managing requests, events, and application queues across system processes and application services. With virtually limitless scalability, it manages peak transaction volumes efficiently, improving business agility and letting IT organizations quickly react to changes in business demands and throughput. Oracle™ Tuxedo optimizes transactions across multiple databases and ensures data integrity across all participating resources, regardless of access protocol. The system tracks transaction participants and supervises an extended commit protocol, ensuring that all transaction commits and rollbacks are properly handled.

Additionally, the Oracle™ Tuxedo system can comply with the Open Group's X/Open™ standards, including the support of the XA standard for two-phase commit (2PC) processing, the X/Open™ ATMI API, the X/Open™ "Distributed Transaction Processing: The TX (Transaction Demarcation) Specification", and the X/Open™ Portability Guide (XPG) standards for language internationalization. The transactional application server can be referred to as an XA server, when it uses the XA standard. For example, each Tuxedo application server that belongs to a Tuxedo group can be configured using an OPENINFO property. All XA servers in a Tuxedo group can use the OPENINFO property to establish the connection to a resource manager (RM).

Single Group Multiple Branches (SGMB)

Generally, Tuxedo requests servers in a same group share one same branch ID in a global transaction. The branch ID can include a format ID, the server's group ID, and the coordinator group ID. This mechanism generally works well across many situations, excepting, for example, when the servers in a same group, or instances of one server, attempt to connect to different instances of an Oracle™ RAC (a desired feature of the Oracle™ RAC), or other similar systems. When this happens, the servers, or instances of the server, in the group involved in a global transaction connect to different instances of an Oracle™ RAC, the transaction may fail because each of the servers share one branch. Generally, an XA error (XAER_AFFINITY) may report, advising that a branch cannot pass through different instances. In order to avoid this, or other similar errors, and in order to improve performance and reduce cross-instance traffic, embodiments of the present invention relate to multiple servers within a group connecting to different resource managers within a database, such as an Oracle™ RAC database having multiple instances, using multiple branches.

Previously, in order to take advantage of the multiple instances within the Oracle™ RAC, or other database having similar properties and advantages associated with multiple instances, a system can route each separate request into distinct and separate groups, each group having one branch associated with one instance. The present disclosure overcomes the fundamental assumption that a server group is associated with a single transaction branch within an XA transaction.

Likewise, in an embodiment, the present disclosure allows a single Tuxedo group to associate with more than one resource manager, and/or more than one instance of a multi-instance resource manager (e.g., a resource manager associated with an Oracle™ RAC cluster database). This allows a Tuxedo group, which can include multiple servers and/or multiple transaction managers, to overcome the assumption that all servers in the single Tuxedo group are associated with one resource manager.

FIG. 1 shows an illustration of using a non-singleton service in a transactional environment, in accordance with an embodiment of the invention. As shown in FIG. 1, a transactional environment 100 can include one or more transaction groups, such as a transaction group 103 and a transaction group 104, in a transaction domain 101.

In accordance with an embodiment of the invention, the transactional servers 111-113 in the transactional environment 100 can connect to a database service 102 through either a singleton service 105 or a non-singleton service 106.

As shown in FIG. 1, the transaction group 103 includes a transactional serverA 111. The transactional server A 111 can connect to a database instance 121 in the database service 102 through a singleton service 105.

Additionally, the transaction group 104, which includes a transactional server B 112 and a transactional server C 113, can connect to different database instances in the database service 102 through a non-singleton service 106, without reporting an error. Here, the transactional server B 112 can connect to a database instance 121, and the transactional server C 113 can connect to the database instance 122.

As an example of a singleton service, a Tuxedo group can connect to an Oracle™ RAC database via a singleton service. The singleton RAC service can be a Distributed Transaction Process (DTP) service if the DTP option is specified (-x in srvctl modify service) or a service that is offered by only one instance.

However, in certain situations, if transaction group 104 were to attempt to connect to the different database instances, e.g., database instance 121 and database instance 122, through a singleton service, then then transaction would fail because each of the servers share one branch, which is not allowed within certain database services. If such a database service was, for example, certain Oracle™ RAC database services, an attempt to connect to multiple instances of a resource manager would result in an XA error (such as XAER_AFFINITY), which advises that a branch cannot pass through different instances.

In certain other situations, where a transaction group 104 attempts connect to the different database instances, e.g., database instance 121 and database instance 122, then then transaction would suffer in performance as the transaction would suffer from increased cross-instance traffic (e.g., a split-branch problem) as the original transaction would still be attempting to connect to the resource manager instance it originally was addressed to.

However, in some embodiments of the present disclosure, the Tuxedo group can connect to multiple instances of an Oracle™ RAC via a non-singleton service 106. This is shown in FIG. 1. The Transaction Group 104 connects, through a non-singleton service, to multiple database instances, e.g., database instances 121 and 122, of database service 102. By passing through a non-singleton service, the server can take advantage of the various advantages and services provided the Oracle™ RAC database, such as load balance, failover, and high availability.

For example, a Tuxedo group can connect to an Oracle™ RAC database via a non-singleton service. In such an example, Tuxedo group connects to more than one resource manager instance of an Oracle™ RAC without generating an affinity error, e.g., XAER_AFFINITY.

It should be noted that although various embodiments described above utilize the Oracle™ Tuxedo transactional middleware environment as well as the Oracle™ RAC database to illustrate embodiments of the disclosure, this should not be taken to mean that the disclosure is so limited. Instead, any number of transactional middleware environments and corresponding resource managers within database services can take advantage of the present disclosure.

Figure 2:
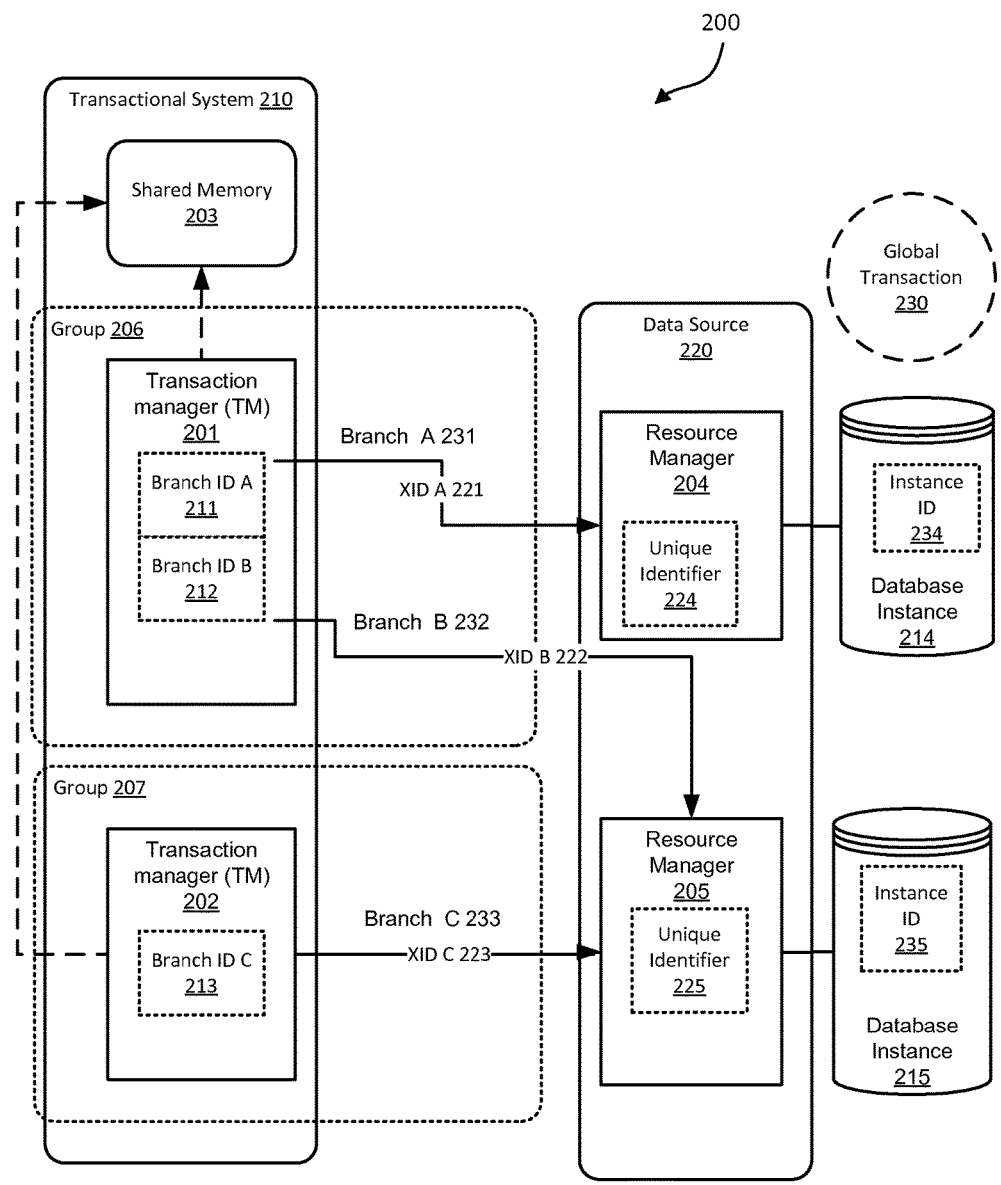
FIG. 2 shows an illustration of processing a global transaction based on database instance awareness in a transactional middleware environment, in accordance with an embodiment of the invention.

FIG. 2 shows an illustration of processing a global transaction 230 based on database instance awareness (which is discussed in more detail with respect to FIG. 3) in a transactional middleware environment, in accordance with an embodiment. As shown in FIG. 2, a transactional system 210 in a transactional environment 200 can support the processing of a global transaction 230 using the resource managers (RMs) 204-205. Additionally, the transactional system 210 can include one or more transaction managers (TMs) 201-202.

Each of the resource managers (RMs) 204-205 can be identified uniquely. As shown in FIG. 2, the RM 204 can be associated with a unique identifier (ID) 224, and the RM 205 can be associated with a unique identifier (ID) 225. Additionally or alternatively, the RMs 204-205 can be uniquely identified based on the identity of the database instances 214-215 (such as the database instance IDs 234-235).

In accordance with an embodiment of the invention, the transactional environment 200 supports database instance awareness. As described in more detail with respect to FIG. 3, database instance awareness allows the transaction managers 201-202 to determine which resource manager (or instance of a multi-instance resource manager), e.g., 204 or 205, each branch of the global transaction 230 is associated with. The resource managers 204 and 205 are in turn associated with database instances, 214 and 215. These determinations are stored in shared memory 203, which the transaction managers 201-202 access to determine which branch is associated with which resource manager, e.g., resource manager 204 and 205. These determinations can be dynamic, but can also be static for a duration of time, meaning a server might change its connection status to a different resource manager, or a server may keep its connection to a certain resource manager.

Furthermore, the transactional system 210 can store the instance awareness information into a shared memory 203, which, in an embodiment, may include a Tuxedo bulletin board (BB). The instance awareness information can include an instance identifier (ID), which identifies a database name, a service name and an instance name. Furthermore, the transactional system 210 can use an index of an instance name as the group branch identifier (e.g. gbranchid).

For example, the Oracle™ Tuxedo system can connect with an Oracle™ Database service, which can include Oracle™ RAC Clusters. Oracle™ Real Application Clusters (RAC) Enterprise database is a cluster database with a shared cache architecture that overcomes the limitations of traditional shared-nothing and shared-disk approaches to provide highly scalable and available database solutions for business applications. Oracle™ RAC is a component of a cloud architecture. Also, in an embodiment, an Oracle™ RAC database can appear to a transaction manager as multiple different resource managers, one for each instance. Additionally, in an embodiment, a single RM may service multiple resource domains using multiple RM instances.

When a RM is associated with an Oracle™ RAC, the database instance awareness capability can be supported based on Oracle™ Database user callback which can retrieve the Oracle™ instance information when a database connection is established. Furthermore, the Oracle™ Tuxedo system can receive the Oracle™ Notification Service (ONS) to adaptively respond to state changes in an Oracle™ database RAC instance.

In accordance with an embodiment of the invention, the transaction manager (TM) in a single transaction group can use different branches for performing a global transaction.

Referring back to FIG. 2, servers in different participated groups, e.g. groups 206-207, can be associated with different RMs, e.g. resource managers 204-205, and through the RMs, to database instances 214-215, using different branches A-C 231-233. Additionally, for each branch of the global transaction 230, the transactional system 210 can generate a different transaction identifier (XID), e.g. XIDs A-C 221-223.

The TM 201, which is associated with the transaction group 206, can manage the branch A 231 and the branch B 232 for the global transaction 230. The branch A 231 can be associated with the RM 204 using a XID A 221, which includes a group branch identifier (ID) A 211, while the branch B 232 can be associated with the RM 205 using a XID B 222, which includes a group branch identifier (ID) B 212.

Additionally, the TM 202, which is associated with the transaction group 207, can manage the branch C 233 of the global transaction 230. The branch C 232 can be associated with the RM 205 using a XID C 223, which includes a group branch identifier (ID) C 213.

In Tuxedo, a Transaction Manager (TM) manages a Tuxedo group, which includes one or more application servers and can be configured with an OPENINFO parameter. All XA servers in a Tuxedo group can use this configuration parameter for establishing the connection to a Resource Manager (RM). Within a global transaction, servers in a participated group can share one or multiple branches, with each individual branch not allowed to go through different instances in an Oracle™ RAC.

In an embodiment, the TM uses a set of interfaces for performing different transactional operations (e.g. commit or abort) on different branches in a global transaction. With single group single branch (SGSB), the state of a branch is defined using the state of the participated group. When the single group multiple branches (SGMB) feature is enabled, the system uses a sub-array for storing the state for each branch in the group.

In accordance with an embodiment of the invention, the transactional system 210 can take advantage optimization features when the participated groups are SGMB groups.

For example, in an embodiment, in preparing a global transaction, if one Tuxedo group has multiple branches, e.g., four branches, each branch having its own XID and RM, then the global transaction can take advantage of a commit/prepare cycle where all but one branch within the group returns Read Only in response to a commit. For such optimization, the transaction manager can issue prepare calls to all but one of the RMs. In such a situation, the all but one RM will return XA_RDONLY, which means no more XA calls are required on those branches. That leaves the one remaining un-prepared RM which can now be committed with an XA_PREPARE( ) with the flag TMONEPHASE, i.e., no prepare will be performed.

Additional descriptions of various embodiments of using read-only optimization feature are provided in U.S. patent application Ser. No. 13/829,176, filed Mar. 14, 2013 entitled "SYSTEM AND METHOD FOR SHARING GLOBAL TRANSACTION IDENTIFIER (GTRID) IN A TRANSACTIONAL MIDDLEWARE ENVIRONMENT", and U.S. patent application Ser. No. 13/829,246, filed Mar. 14, 2013 entitled "SYSTEM AND METHOD FOR SUPPORTING APPLICATION INTEROPERATION IN A TRANSACTIONAL MIDDLEWARE ENVIRONMENT", which applications are herein incorporated by reference.

Additionally, the transactional system 210 can take advantage of the common XID feature and the XA Affinity feature, when the participated groups are SGMB groups. The XA Affinity feature for global transactions attempts to ensure that all the database operations for a global transaction performed on an Oracle™ RAC cluster are directed to the same Oracle™ RAC instance. For example, the first connection request for an XA transaction can be assigned with an Affinity context based on load balance. Then, all subsequent connection requests are routed to the same Oracle™ RAC instance using the Affinity context of the first connection. In embodiments where it is not possible to honor affinity, a new instance can be enlisted in the transactions with a new branch qualifier.

Instance Awareness

Figure 3:
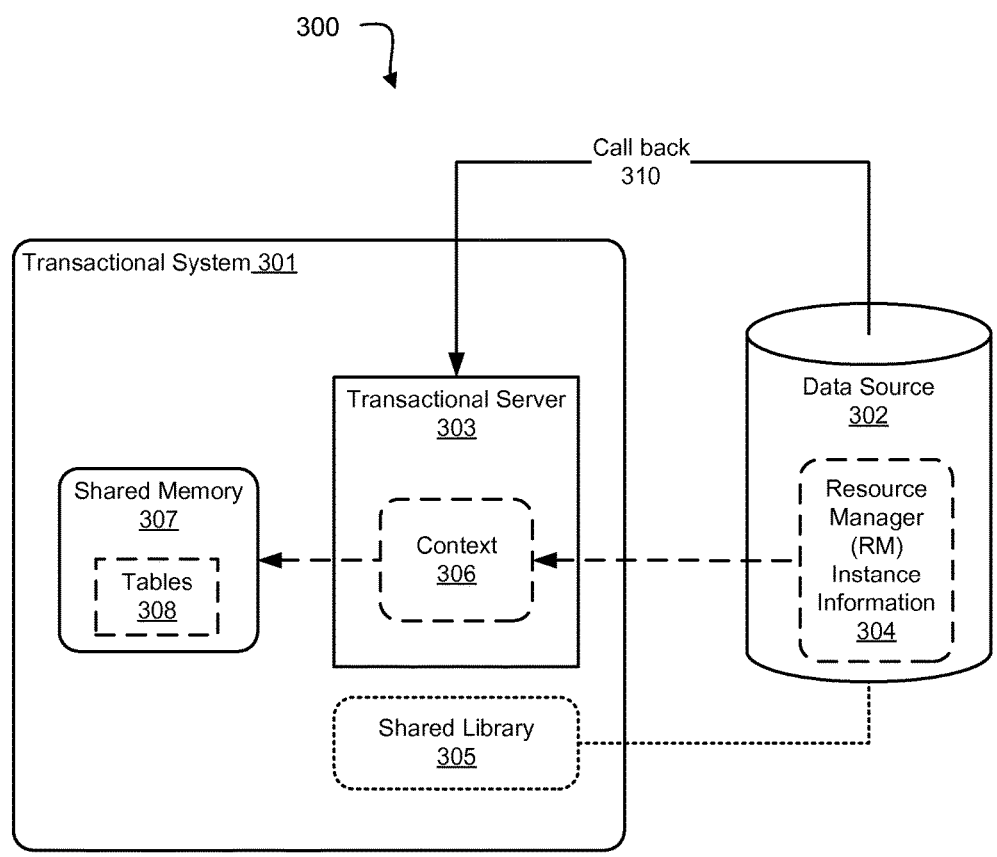
FIG. 3 shows an illustration of supporting resource manager (RM) instance awareness in a transactional environment, in accordance with an embodiment of the invention.

FIG. 3 shows an illustration of supporting resource manager (RM) instance awareness in a transactional environment, in accordance with an embodiment of the invention. As shown in FIG. 3, a transactional system 301 in a transactional environment 300 can support transaction processing using one or more resource manager (RM) instances associated with a data source 302, such as a database.

In accordance with an embodiment, the transactional system 301 can be aware of the RM instance information 304 in the data source 302. For example, a transaction server 303 in the transactional system 301 can obtain the RM instance information 304 from the data source 302 by taking advantage of a user callback 310. The transactional system 301 can use different mechanisms for registering the user callback 310, e.g. a static registration mechanism and a dynamic registration mechanism. Once registering the user callback 310, the system 300 can store the information in a shared memory 307, and optionally within a table 308 within the shared memory.

In an embodiment, the system 300 can determine which instance of a resource manager any particular server (e.g., a server within a Tuxedo group) is connected to (e.g., where a connection has landed). To do so, a server can perform xa_open to establish a connection to a database. After the connection has landed, OCI can provide various mechanisms with which a callback is initiated, both before and after a session is established. After a connection has been established, the system 300 can establish where the connection ended up (e.g., which resource manager instance the session connected to). In looking at the OCI handle information, the system can determine which resource manager instance is connected to which sever. OCI calls back when a session has been established, and this information can be stored in shared memory 307. Additionally or alternatively, OCI can provide a callback before a session is initiated, wherein the callback can allow a transaction manager to steer a session to a particular resource manager.

In an embodiment, the transaction server 303 can dynamically register a user callback 310, e.g. based on a shared library 305 associated with the data source 302. For example, Tuxedo can dynamically register the callback when a user connects to an Oracle™ Database using a non-XA server (e.g. via OCI or Pro*c/c++). Tuxedo can first load Oracle™ OCI library OCI API dynamically and obtain the related OCI environment handle. Then, Tuxedo can register a user callback via an OCIUserCallbackRegister, and as a result of registering the user callback, when OCISessionBegin executes, the system can make the callback to the registered callback function.

As shown in FIG. 3, the system can store the obtained instance information 304 in a related context 306 associated with the transactional server 303. Additionally, the transactional server 303 can store the instance information 304 into the different state tables 308 in a shared memory 307 (e.g. the bulletin board (BB) in Tuxedo). These tables 308 can be synchronized to different nodes, and can be accessed by multiple transactional servers and/or native clients.

It should be noted that although the embodiment shown in FIG. 3 depicts instance awareness for one transaction server, the same or similar systems may be utilized for instance awareness for one or more transactional managers, e.g. transaction managers 201-202, which know which resource manager or database instance that it connects to.

Additional descriptions of various embodiments of the instance awareness feature are provided in U.S. Patent Provisional Application No. 61/985,135, filed Apr. 28, 2014, entitled "COMMON TRANSACTION IDENTIFIER (XID) OPTIMIZATION BASED ON DATABASE INSTANCE AWARENESS", U.S. patent application Ser. No. 14/587,468, filed Dec. 31, 2014, entitled "SYSTEM AND METHOD FOR SUPPORTING COMMON TRANSACTION IDENTIFIER (XID) OPTIMIZATION BASED ON RESOURCE MANAGER (RM) INSTANCE AWARENESS IN A TRANSACTIONAL ENVIRONMENT," and U.S. patent application Ser. No. 14/587,474, filed Dec. 31, 2014, entitled "SYSTEM AND METHOD FOR SUPPORTING COMMON TRANSACTION IDENTIFIER (XID) OPTIMIZATION BASED ON RESOURCE MANAGER (RM) INSTANCE AWARENESS IN A TRANSACTIONAL ENVIRONMENT," which applications are herein incorporated by reference.

Single Group Multiple Branches

Figure 4:
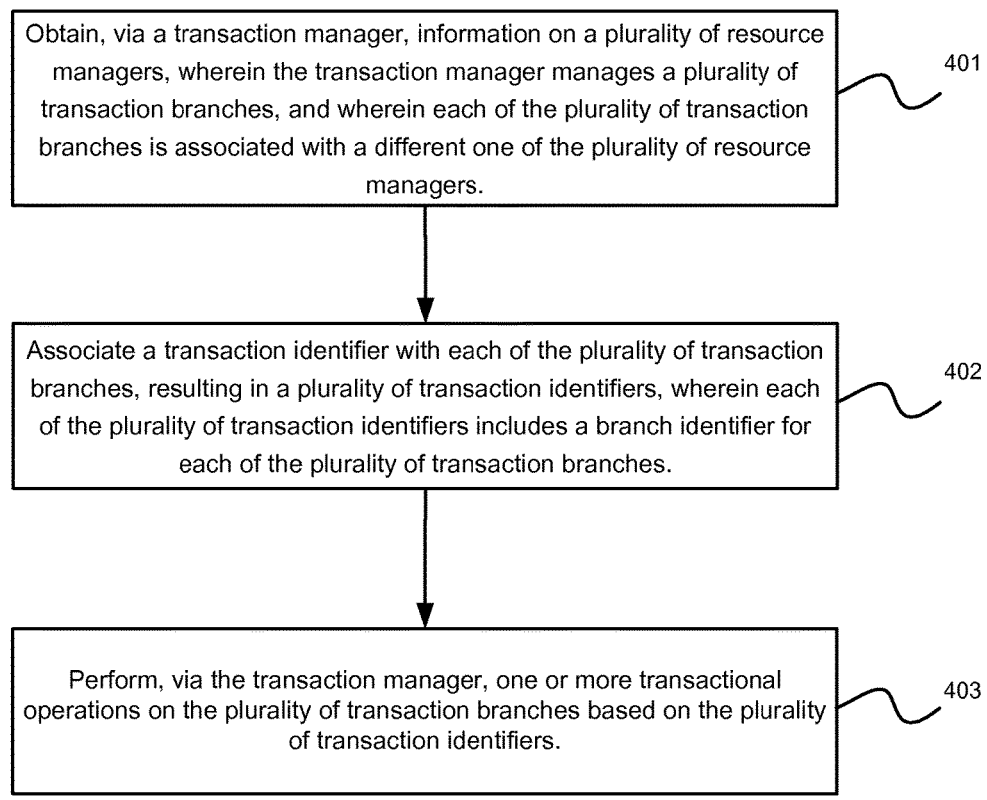
FIG. 4 shows an exemplary flow chart illustrating a method for providing high throughput transactions in a transactional system, in accordance with an embodiment of the invention.

FIG. 4 illustrates an exemplary flow chart for providing high throughput transactions in a transactional system. As shown in FIG. 4, at step 401, the method can obtain, via a transaction manager, information on a plurality of resource managers, wherein the transaction manager manages a plurality of transaction branches, and wherein each of the plurality of transaction branches is associated with a different one of the plurality of resource managers. At step 402, the method continues with associating a transaction identifier with each of the plurality of transaction branches, resulting in a plurality of transaction identifiers, wherein each of the plurality of transaction identifiers includes a branch identifier for each of the plurality of transaction branches. Furthermore, at step 403, the method can perform, via the transaction manager, one or more transactional operations on the plurality of transaction branches based on the plurality of transaction identifiers.

Process—Generation of XID

In some embodiments, the group branch id (instance index) will be involved as a new field of the branch qualifier (bqual). If the instance index is invalid (−1), it may not be added. Furthermore, the type of instance index can be short.

In such situations, the bqual will be: [formatID][coordinator group id][current group id][current group branch id].

In some embodiments, there may be involved mapping between gtrid and XID. In such situations, a group branch id (instance index) is appended into the branch qualifier. One such example is shown here:

```
#define XIDGBRANCHID      GBRANCHID
#define XIDGBRANCHID_OFFSET  (RDMADOM_UBB?
Sizeof(TM321)*3:    sizeof (TM321)*2)
#define XIDGBRANCHID_SIZE   (GBRANCHID == -1 ? 0 :
sizeof(short))
/**
 * generate XID through context and Tuxedo GTRID
 * replacement of the MACRO_XAGTRID_TO_XID
 */
void tmxatuxgtrid2xid(_TCADEF, GTRID *gtridp, XID *xidp)
/**
  *generate Tuxedo GTRID through XID
  *replacement of the MACRO_XAXID_TO_GTRID
  *xidp[in | out]:
  *   if the xidp is comongtrid, the original Tuxedo XID will be stored
      back to xidp
  *   the common gtrid is stored into TUXC->_TUXC_importedXid
  *   the branch id is stored into CGBRANCHID
  */
void tmxaxid2tuxgtrid (_TCADEF, XID * xidp, GTRID *gtrdip)
```

Process—Feature Platform Control

In an embodiment, a runtime feature supported mechanism can be introduced. This feature allows the system to propagate one platform-specific feature in other platform via a patch. Before this, the Tuxedo can be rebuilt due to the compile support mechanism, macro.

In certain embodiments, this is completed by a global hard-coded variable. Each feature has one related feature bit in the global variable. For example:

```
/*runtime feature bit control for rac related features*/
#define FB_SGMB        0x00000010
/*single group multiply branches*/
extern TM32I runtime_featurebit_racrelated;
#define SGMB _SUPPORTED
(runtime_featurebit_racrelated& FB_SGMB)
TM32I runtime_featurebit_racrelated= FB_INSTAWARE|
FB_COMMXID| FB_XAAFFINITY | FB_SGMB;
```

Process—Feature Configuration Control

In some embodiments, in order for the methods and systems to take advantage of the benefits provided by single group multiple branches, as opposed to a singleton environment, the EECS option is specified in a resource. For example:

```
#define EECS_CONF_ENABLED(pparms)    ((EECS_SUPPORTED) && ((pparms) !=
NULL) && ((pparms)->options & TMEECS))
#define EECS_ENABLED       ((TUXC->_TUXC_tmbbp != NULL) &&
EECS_CONF_ENABLED(&(TUXC->_TUXC_tmbbp->bbparms)))
#define SGMB_CONF_ENABLED(pparms)   (SGMB_SUPPORTED &&
EECS_CONF_ENABLED(pparms) && !((pparms)->rmoptions & TMRMNO_SGMB))
#define SGMB_BB_ENABLED       ((TUXC->_TUXC_tmbbp != NULL) &&
SGMB_CONF_ENABLED(&(TUXC->_TUXC_tmbbp->bbparms)))
#define SGMB_CACHED_ENABLED      (TUXC->_TUXC_cached_sgmb_enabled)
#define SGMB_ENABLED      (TUXC->_TUXC_tmprotected ?
SGMB_CACHED_ENABLED : SGMB_BB_ENABLED)
```

Process—Group Branch ID Crossing Tuxedo Server and Client

In some embodiments, the group branch id related to the involved groups will be transferred in META_TCM, a header used by Tuxedo. All keys can be stored together. An invalid group branch id indicates the end of one group's branch id part unless all available group branch ids are valid of the group. For example:
tpadm
TA_TRAN_GBRANCHID 34 short-/*the involved group's branch id*/

In certain embodiments, there may be synchronization between a context and a message. As soon as one new group is added in a GTTE (global transaction table entry), those branch ids that are related will also be added, unless the group is thought to be a common-xid group. The below provides an example of synchronization from GTTE to context:

```
/*request message outbound */
tmtran_send_rqst( )
{
    /*sync group branch id from GTTE into context */
}
_tmextran_send_rqst( )
{
/*store group branch id from context into META_TCM*/
}
/*request message inbound*/
_tmtran_recv_rqst
{
    /*get group branch id from TUXT->_TUXT_currtran_msg and
store into context*/
    tmbblock( );
    /*sync group branch id from context to BB*/
}
/*reply message outbound*/
_tmtran_send_rply_ctl_tranmode( )
{
    /*sync group branch id from GTTE into context*/
    tmbbunlock( );
}
```

```
/*reply message inbound*/
_tmtran_recv_rply( )
{
    /*get group branch id from META_TCM into context*/
    tmbblock( )
    ...
    /*sync group branch id into GTTE*/
    ...
    return;
}
```

Additionally, in some embodiments, the system may synchronize from context to GTTE. For example, when Tuxedo synchronizes the involved groups in GTTE, the synchronization of the group branch id, in some embodiments, can be done together. In a special case, if the invoker of a server associated with a database, its group will be added into GTTE. Additionally, its group branch id will also be added, for example:

```
_tmg_addmsgroups( )
{
    /*sync group branch id from context to GTTE*/
}
_tmgmakegtte( )
{
    /*set group branch id*/
}
```

Process—Group Branch ID Crossing Tuxedo Transaction Management Server (TMS)

In some embodiments, inter-Transaction Management Server (TMS) communication is completed by a tms_send message. This message can include the command, as well as the group ids of the groups involved with the transaction. The message can be transferred and synchronized with NOTRAN mode. For example:
tms_send(TCADEF, GRPID *tolist, long service, GRPID *sendlist)

The tms_send message can be enhanced to send group branch id from the context at the same time when to add each group in the "tolist" into the request message for some special TMS requests. In such situations, the precommit request is necessary to send a group branch id. For safety reasons, the commit request may also send the group branch id.

Process—TMS External Committing Commands

In some embodiments, a Transaction Management Server command is "manage" (e.g., tms_manage). tms_manage can be used to notify those groups involved with a transaction to do the prepare according to the invoking means, e.g., tpcommit.

In situations when GTTE is unexpectedly unavailable when a Transaction Management Server command is "manage" (e.g., tms_manage)—some embodiments of the present disclosure may set TUXC_gbranchnum to zero before tms_send is invoked as no branch id information was retrieved from the GTTE.

1 PC judgment—In a one-phase commit environment (1PC), there is not only one group involved, but also only on branch id in the involved group. In such situations, the current group is set before performing the one-phase commit.

Group state check—in some embodiments, when the TMS is checking a group's state, the TMS concurrently, before or after, checks the state of the group's branches. This is performed as a defensive check.

Prepare group branch id—in some embodiments, when a group is enlisted into preparing a list, its group branch id is also enlisted into the context so that tms_send can transfer the group branch ids together.

Process—TMS Self-Committing Commands

In various embodiments, the TMS also incorporates self-committing commands. These commands include, but are not limited to, precommit/commit/abort/timeout/hcommit/habort.

In an embodiment, the TMS Set-Committing Commands further include a command to set a current group branch id before doing any XA operation.

In an embodiment, the precommit and commit commands may allow for group branch id synchronization.

In situations when GTTE is unexpectedly unavailable during TMS self-committing commands—some embodiments of the present disclosure may set TUXC_gbranchnum to zero before tms_send is invoked as no branch id information was retrieved from the GTTE.

Prepare group branch id (precommit/commit)—In an embodiment of the present disclosure, when a group(s) is enlisted into the tolist, its group branch id(s) are enlisted into the context so that the tms_send can transfer the group branch ids together.

Process—Routines for TMS Self-Committing Commands

In embodiments of the present disclosure, the TMS self-committing commands include prepare/commit/abort/timeout. These self-committing commands can be invoked from the original prepare/commit/abort/timeout when the target group is found as a multi-branched group.

In situations when GTTE is unexpectedly unavailable—some embodiments of the present disclosure may set TUXC_gbranchnum to zero before tms_send is invoked as no branch id information was retrieved from the GTTE.

Group state check—in some embodiments, when the TMS is checking a group's state, the group's branches can also be checked concurrently, before or after.

Local transaction—in some embodiments, the group's state comprises the state of all of the group's branches.

In certain embodiments, the group's state will only be updated if all of that group's branches return a state "ready" or "done." Additionally, for example, if a branch within a group fails, the group can be marked to abort.

In an embodiment, the state of each branch within a group can be stored as a local variable, temporarily, according to the result of XA operations. This variable can then be updated into the Tuxedo Bulletin Board (BB) after the XA operation has finished. For example:

```
tms_mb_precommit0
{
    char gbranchstate[TMGMAXGBRANCES];
    char groupstate;
    char localtran;
    for each group branch
            do xa operation
            update cached branch state
            if failed, mark local tran failed, then break out
            if rdonly1pc request && not the last branch && any
branch not return readonly
                set local transaction fails, then break out
            if rdonly1pc && last branch && all other branches
            are readonly
                do 1pc on the last one
            get bb lock
            if local tran faild,
                invoke transaction abort
}
tms_mb_commit( )
{
for each group branch
        do xa operation
        if RM connection failed, break out
        update branch state
        get bb lock
        update branch state to GTTE
}
tms_mb_abort( )
{
    for each group branch
        do xa operation
        if RM connection failed, break out
        update branch state
        get bb lock
        update branch state to GTTE
}
Tms_mb_timtout( )
{
    for each group branch
        do xa operation
        if RM connection failed, break out
        update branch state
        get bb lock
        update branch state to GTTE
}
tms_sendabort( )
{
    /*prepare group branch id*/
    tms_send( );
}
```

Process—Routines for TMS Heuristic Committing Commands

In an embodiment, the TMS Heuristic committing commands include hcommit/habort/ghabort. In an embodiment, the routine for ghabort uses tms_ghabort with no additional change. For example:

```
tms_mb_hcommit( )
{
    /*like tms_mb_timeout*/
}
tms_mb_habort( )
    /*like tms_mb_timeout*/
}
```

Process—TMS Notifications

In an embodiment, the TMS notifications include status/abortonly/ready/done/tuxforget. In certain instances, the methods and systems do not require the TMS to transfer the group branch id in one of the notification messages. In such situations, tms_send will ignore the group branch id for these kinds of messages. For example:

```
tms_ready( )
{
    /*prepare gbranchid if commit is necessary*/
}
tms_abortonly( )
{
    /*do nothing more */
}
tms_status( )
{
    /*TLOG issue */
}
tms_done( )
{
    /*do nothing more */
}
tms_tuxforget( )
{
    /*confirm each commxid group has only one branch id*/
}
```

Process—Transaction Log (TLOG) Enhancement

In an embodiment, the TLOG may be variously enhanced. Such an enhancement, for example, can come in the form of a variable part in TLOG.

In such an embodiment, due to the size limitation in on TLOG entry (e.g., 512 bytes), a variable part can be introduced to store those data that only exist under certain situations and/or circumstances. Normally, these variables also exist when some feature is enabled.

In order for such a variable to be introduced, it can contain a "field side" (e.g., "vsize") of struct tlgrec_data_t. The value associated thereto can indicate the size of the variable part of TLOG.

Additionally, the variable part can consist of data segments, wherein each data segment includes a header (e.g., "VFLAG") and one field part. The header of the variable part can indicate the type of field (e.g., "VFID") as well as the size of the field (e.g., "VFSIZE") associated therewith.

An exemplary deployment of the TLOG entry in storage is shown below:

```
                        chksum
        tlgrec_data_t   vsize
                        ctl_tbl
                    VFLAG(VFID+VFSIZE)
                        VFIELD              VFSIZE
                vsize VFLAG(VFID+VFSIZE)
                        VFIELD
                            ...
/*in vpart of tlog,vflag,a type short, 0-10 0-1023, field size;
11-15 64, field id*/
#define VFLAGSIZE    sizeof(short)
#define VFID_MASK    0xFC00
#define VFSIZE_BIT   10
#define VFSIZE_MASK            0x03FF
#define GET_VFID(d)
(((d)&VFID_MASK)>>VFSIZE_BIT)
#define SET_VFID(d, i)
(d=((d)&VFSIZE_MASK)|(((i)<<VFSIZE_BIT)&VFID_MASK))
#define GET_VFSIZE(d)           ((d)&VFSIZE_MASK)
#define SET_VFSIZE(d, s)
(d=((d)&VFID_MASK)|((s)&VFSIZE_MASK))
/*fieldid 1-63*/
#define VF_SGMB      0x001
#define VF_RDMADOM   0x002
typedef struct{
    short vfid;
    short vfsize;
    char* vfptr;
}TLOGVFIELD;
#define TLOGREC_VPTR(tlogrec)  ((char*)&((tlogrec)->vdata))
/*fixed size, used for chksum*/
#define TLOGREC_FSIZE  (sizeof(struct tlgrec_t) –
2*sizeof(TM32I))
#define TLOGREC_MAXVSIZE (_TMPAGESIZE –
sizeof(struct tlgrec_t) – sizeofTM32I))
/**
 * get the beginning address of the specific field in the variable part
 * of the TLOG entry. Please note the address includes int vflag.
 * vfield[out]: the value of the vfield
 * ivfid[in]: the specific field id to find
 * ivsize[in]: the size of the vairable part
 * ivptr[in]: the beginning address of the vairable part
 * return: 0 OK, –1 failed(format error or not found)
 */
int _tlog_getVfield(_TCADEF,TLOGVFIELD* ovfield,short ivfid,
unsigned short ivsize, const char* ivptr)
/**
 * parse the variable part in the TLOG entry
 * ivsize[in]: the size of the vairable part
 * ivptr[in]: the beginning address of the vairable part
 * return: 0 OK, –1 failed(format error or unknown field)
 */
static int _tlog_parseVpart(_TCADEF,unsigned short ivsize, char*
ivptr)
/**
 * write the related information in the context about the
 * specific field into the address.
 * ivfid[in]: the field to be written
 * ivptr[in]: the beginning address to be writen in the TLOG entry
 *
 * return: –1 error >=0 how many size written
 */
static int _tlog_writeVfield(_TCADEF,short ivfid, TLGREC
*tlpage)
```

Additionally, in some embodiments the group branch id of the groups in the TLOG record will be stored as another variable data (e.g., "VF_SGMB"). For example:

```
tms_status( )
{
    /* prepare gbranchid from GTTE*/
    tlog_commit
}
/*refer to next section*/
_tmglogadd( )
{
    If(TMLOAD) tlog_commit
    /*add gbranchid from TUXC into GTTE*/
}
_tlog_warmstart( )
{
    /* prepare gbranchid from TLOG record into TUXC*/
    _tmglogadd(..., TMGWARMSTART,...)
}
/*gtte information dump*/
DBG_Prt_gtte/ _tmgttelog/Prt_gtt
{
    /*support dump gbranchid*/
}
```

In an embodiment, the methods and systems may map the TLOG record between mib/string format and structure format. In such situations, each variable date in TLOG can use the format (fieldID, . . . ).

For example, Tuxedo can allow a user to dump the TLOG record into string format by way of tmadmin "dumptlog". Additionally, Tuxedo can also allow a user to load the TLOG record from the string format via the command "loadtlog".

In an embodiment, a TLOG migration can dump all related TLOG records into a string format. After the dump is performed, the string format can be transferred to a target node where the TLOG record can be loaded back.

In an embodiment, the format for the variable data SGMB is: (fieldID,gbranchnun,gbranch0, . . . gbracnhx)

Here is an example pseudo code showing TLOG record mapping:

```
_tmib_parsetlog( )
{
    /*support mapping gbranchid part between mib fromat and structure
format in the TLOG record*/
}
set_tlog( )
{
    _tmib_parsetlog
/*read gbranchid from the string format TLOG record into the context */
    _tmglogadd(...,TMLOAD,...);
}
get_tlog
{
    /*support blkchksum*/
    _tmib_parsetlog( )
}
convertASCII( )
{
    /*support mapping gbranchid part in the TLOG record to string
    fromat */
}
_tmdumptlog( )
{
    /*support blkchksum*/
    convertASCII( )
}
tmadl( )
{
    /*support blkchksum*/
    convertASCII( )
}
tmbbltranrpc( )
{
    /*read gbranchid from the string format TLOG(request data)
    record into the context */
    _tmglogadd(...,TMLOAD,...);
}
```

In an embodiment, the methods and systems described herein can perform error handling when there is no space in a TLOG record branch for a branch id. In such situations, tlog_commit is used to store the TLOG record into a TLOG file, which can be invoked by tms_status. The tms_status performs no action if tlog_commit fails. In such situations the tmgttscan will try to send TMS_STATUS to the coordinator. In the event of these unrecoverable errors from tlog_commit, tms_status can invoke abortonly in order to abort the transaction.

Process—DMTLOG Enhancement

Storing group branch id—In an embodiment, the methods and systems can store the group branch id. In such situations, gwlog_format( ) can be used to map a DMTLOG record from structure to storage format. Conversely, gw_repoptrantable( ) can be used to map DMTLOG record from storage to structure format. As an example:

```
_gwlog_get_tranvalues
{
    /*get the group branch id from GTTE*/
}
_gwlog_format( )
{
    _gwlog_get_tranvalues( );
    ...
    /*store the group branch id into DMTLOG*/
}
_gwlog_set_tranvalues ( )
{
    /*get the group branch id from DMTLOG*/
}
gw_repoptrantable( )
```

-continued

```
{
    /*init gbranchid in the local GTTE, support gbranchid in DMTLOG
    _gwlog_set_tranvalues deal with the ignoring issue
    */
    _gwlog_set_tranvalues
}
```

Process—Transaction Recovery

In an embodiment, it may be necessary to retrieve the group branch id from the XID returned by a xa_recover. In such situations, the absolute offset of the group branch id is different when the bypass domain is enabled versus not enabled. Additionally, the group branch id may not exist when the owner group has no instance information.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A method for providing high throughput transactions in a transactional system, comprising:

obtaining, via one transaction manager associated with one transaction group, information on a plurality of resource managers within a database comprising a plurality of instances, each of the plurality of instances being associated with a resource manager of the plurality of resource managers, wherein the information on the plurality of resource managers comprises a unique identifier associated, respectively, with each of plurality the resource managers, wherein the one transaction manager manages a plurality of transaction branches from the one transaction group, and wherein each of the plurality of transaction branches is associated with a different one of the plurality of resource managers;

associating a transaction identifier with each of the plurality of transaction branches, resulting in a plurality of transaction identifiers, wherein each of the plurality of transaction identifiers includes a branch identifier for each of the plurality of transaction branches;

performing, via the one transaction manager, one or more transactional operations on the plurality of transaction branches based on the plurality of transaction identifiers; and storing each of the unique identifiers associated, respectively, with each of the plurality of resource managers at a shared memory.

2. The method of claim 1, wherein the shared memory is accessible by at least another transaction manager associated with another transaction group.

3. The method of claim 2, wherein the unique identifier for each of the plurality of resource managers is associated with a different database instance.

4. The method of claim 1, further comprising:
storing each of the plurality of transaction identifiers in the shared memory.

5. The method of claim 4, further comprising:
determining, by the transaction manager, an association between each unique identifier and each transaction identifier, based upon the stored unique identifiers and the stored transaction identifiers.

6. The method of claim 1, wherein the obtaining, via a transaction manager, information on a plurality of resource managers comprises:
receiving a user callback, the user callback being associated with the information on the plurality of resource managers; and
registering the user callback.

7. The method of claim 6, wherein the registering the user callback utilizes one of at least a static registration mechanism and a dynamic registration mechanism.

8. A system for providing high throughput transactions in a transactional system, comprising: one or more microprocessors;
a processor, running on the one or more microprocessors, wherein the processor operates to perform the steps comprising;
obtaining, via one transaction manager associated with one transaction group, information on a plurality of resource managers within a database comprising a plurality of instances, each of the plurality of instances being associated with a resource manager of the plurality of resource managers, wherein the information on the plurality of resource managers comprises a unique identifier associated, respectively, with each of the plurality of resource managers, wherein the one transaction manager manages a plurality of transaction branches from the one transaction group, and wherein each of the plurality of transaction branches is associated with a different one of the plurality of resource managers;
associating a transaction identifier with each of the plurality of transaction branches, resulting in a plurality of transaction identifiers, wherein each of the plurality of transaction identifiers includes a branch identifier for each of the plurality of transaction branches;
performing, via the one transaction manager, one or more transactional operations on the plurality of transaction branches based on the plurality of transaction identifiers; and
storing each of the unique identifiers associated, respectively, with each of the plurality of resource managers at a shared memory.

9. The system of claim 8, wherein the shared memory is accessible by at least another transaction manager associated with another transaction group.

10. The system of claim 9, wherein the unique identifier for each of the plurality of resource managers is associated with a different database instance.

11. The system of claim 8, wherein the processor operates to perform the further steps comprising:
storing each of the plurality of transaction identifiers in the shared memory.

12. The system of claim 11, wherein the processor operates to perform the further steps comprising:
determining, by the transaction manager, an association between each unique identifier and each transaction identifier, based upon the stored unique identifiers and the stored transaction identifiers.

13. The system of claim 8, wherein the obtaining, via a transaction manager, information on a plurality of resource managers comprise:
receiving a user callback, the user callback being associated with the information on a plurality of resource managers; and
registering the user callback.

14. The system of claim 13, wherein the registering the user callback utilizes one of at least a static registration mechanism and a dynamic registration mechanism.

15. A non-transitory machine readable storage medium having instructions stored thereon that when executed cause a system to perform the steps comprising:
obtaining, via one transaction manager associated with one transaction group, information on a plurality of resource managers within a database comprising a plurality of instances, each of the plurality of instances being associated with a resource manager of the plurality of resource managers, wherein the information on the plurality of resource managers comprises a unique identifier associated, respectively, with each of plurality the resource managers, wherein the one transaction manager manages a plurality of transaction branches from the one transaction group, and wherein each of the plurality of transaction branches is associated with a different one of the plurality of resource managers;
associating a transaction identifier with each of the plurality of transaction branches, resulting in a plurality of transaction identifiers, wherein each of the plurality of transaction identifiers includes a branch identifier for each of the plurality of transaction branches;
performing, via the one transaction manager, one or more transactional operations on the plurality of transaction branches based on the plurality of transaction identifiers; and
storing each of the unique identifiers associated, respectively, with each of the plurality of resource managers at a shared memory.

16. The non-transitory machine readable storage medium of claim 15 wherein the shared memory is accessible by at least another transaction manager associated with another transaction group.

17. The non-transitory machine readable storage medium of claim 16, wherein the unique identifier for each of the plurality of resource managers is associated with a different database instance.

18. The non-transitory machine readable storage medium of claim 15, having instructions thereon that when executed cause a system to perform the further steps comprising:
storing each of the plurality of transaction identifiers in the shared memory.

19. The non-transitory computer readable storage medium of claim 18, having instructions thereon that when executed cause a system to perform the further steps comprising:
determining, by the transaction manager, an association between each unique identifier and each transaction identifier, based upon the stored unique identifiers and the stored transaction identifiers.

20. The non-transitory computer readable storage medium of claim 15, wherein the obtaining, via a transaction manager, information on a plurality of resource managers comprises:
- receiving a user callback, the user callback being associated with the information on a plurality of resource managers; and
- registering the user callback;
- wherein the registering the user callback utilizes one of at least a static registration mechanism and a dynamic registration mechanism.

* * * * *

UNITED STATES PATENT AND TRADEMARK OFFICE
CERTIFICATE OF CORRECTION

PATENT NO. : 10,061,607 B2
APPLICATION NO. : 14/709740
DATED : August 28, 2018
INVENTOR(S) : Zhang et al.

Page 1 of 1

It is certified that error appears in the above-identified patent and that said Letters Patent is hereby corrected as shown below:

In the Specification

In Column 14, Line 14, delete "faild," and insert -- failed, --, therefor.

In Column 14, Line 31, delete "timtout" and insert -- timeout --, therefor.

In Column 15, Line 24, delete "in on" and insert -- in --, therefor.

In Column 16, Line 24, delete "writen" and insert -- written --, therefor.

In Column 16, Line 67, delete "gbracnhx)" and insert -- gbranchx). --, therefor.

In Column 17, Line 6, delete "fromat" and insert -- format --, therefor.

In Column 17, Line 20, delete "fromat" and insert -- format --, therefor.

In the Claims

In Column 20, Line 61, in Claim 19, delete "computer" and insert -- machine --, therefor.

In Column 21, Line 1, in Claim 20, delete "computer" and insert -- machine --, therefor.

Signed and Sealed this
Second Day of March, 2021

Drew Hirshfeld
*Performing the Functions and Duties of the
Under Secretary of Commerce for Intellectual Property and
Director of the United States Patent and Trademark Office*